SYNCHRONIZED DATA PROCESSING SYSTEM

Filed Sept. 24, 1957 2 Sheets-Sheet 1

Inventors
JOHN F. SULLIVAN
GEORGE W. REICH, JR.
By Philip M. Bolton
Attorney

Inventors
JOHN F. SULLIVAN
GEORGE W. REICH, JR.
By Philip M. Bolton
Attorney 2,912,585

SYNCHRONIZED DATA PROCESSING SYSTEM

John F. Sullivan, Bloomfield, and George W. Reich, Jr., Wyckoff, N.J., assignors to International Telephone and Telegraph Corporation, Nutley, N.J., a corporation of Maryland Application September 24, 1957, Serial No. 685,931

5 Claims. (Cl. 250—27)

This invention relates to a synchronized data processing operation and more particularly to a synchronized counter system.

Counter circuits may be classified as either of the sequence-operated type or the energy storage type. Most sequence-operated circuits are in the form of a ring counter, which is formed by assembling a series of bistable devices in "ring" fashion. Each bistable device has two stable states, which are designated as "on" and "off." An example of such a ring counter would be a circuit arrangement where the pulses to be counted are applied simultaneously to all the bistable devices, and these devices are so inter-related that a pulse will turn a bistable device "on" only if the bistable device immediately preceding it is "on" at the time the pulse is applied, and, moreover, the inter-relation makes it possible for only one bistable device to be "on" at a time. As each input signal is received or counted, a predetermined state of the bistable devices, for instance, the "on" state, is advanced in ordered sequence around the ring.

Ring counters, in general, are used to sequence logical circuitry or to program data processing operations. It is often necessary to synchronize the program derived from the ring counter to the time relationship of the data being processed. If the ring counter is not in synchronism, the order of the data being processed will not be in the proper relationship thereby resulting in erroneous data processing.

Various methods of synchronizing ring counters are presently known. The simplest and most common method utilized is that of forcing all the bistable devices into a predetermined state. This is accomplished by applying a synchronizing pulse of sufficient amplitude and width to the same respective control elements of each of the bistable devices to be synchronized. This synchronizing pulse will "force" the bistable devices to conduct in the same respective states, for instance, the "on" state, at a predetermined interval. While this method has been used extensively and has merit, it contains certain inherent disadvantages; these being, that over a certain period of time tube parameters of the bistable devices as well as characteristics of its components may change thereby resulting in a condition where the synchronizing pulse which "flips" all the bistable devices to the predetermined state will be inadequate and thereby cause the operator to continually compensate for this change by having to adjust the potentiometer to which the synchronizing pulses are coupled. Failure to so compensate will result in the failure of bistable devices to conduct in their proper time sequence. A further disadvantage is that each stage of the ring counter must have synchronizing circuitry coupled thereto.

Another method used to synchronize ring counters is that of using coincidence gates to check for coincidence between a state of a given counter and a snychronizing pulse. This method demands a synchronizing pulse for every revolution of the ring counter. However, if two or more sets of ring counters having a different number of stages are to be used, it becomes necessary to have independent sources of synchronizing pulses for each ring counter.

An object of the present invention, therefore, is to provide for an improved system for synchronizing data processing operations, particularly ring counters.

Another object of the present invention is the provision of a more reliable system for synchronizing ring counters.

Still another object of the present invention is to provide a synchronizing system which is adapted to synchronize a plurality of ring counters even if each has a different number of stages.

A further object of the present invention is to provide a system which will synchronize two or more sets of ring counters from a common synchronizing source.

One feature of the present invention is the provision of a system to synchronize a ring counter where the repetition period of the synchronizing pulse is a submultiple of the period of the ring cycle.

Other and further objects and features of the present invention will become apparent, and the foregoing will be better understood with reference to the following description of an embodiment thereof, reference being had to the drawings, in which.

Generally speaking, the synchronizing system more specifically described hereinafter operates in the following manner. A ring counter is fed by a source of clock pulses along two separate channels. When the count reaches a predetermined stage, one of said channels is automatically blocked until the count passes said stage, which normally occurs due to the feeding of clock pulses through the second of said channels. For a given number of complete cycles of said counter, a synchronizing pulse is applied to cut off the second channel. If this counter is in synchronism, the same synchronizing pulse that cut off the second channel is, after a slight fixed delay, applied to reopen said second channel if the count has reached the above-mentioned predetermined stage. If the count has not reached this predetermined stage when the delayed synchronizing pulse arrives, the second channel remains cut off and pulses continue to be fed through the first channel until the count reaches said predetermined stage at which time the counting halts since both the first and second channels are cut off and the count is not started again until the next synchronizing pulse arrives. This next synchronizing pulse after a fixed delay reopens the second channel and clock pulses therethrough drive the count, which is now in synchronism, past said predetermined state which results in opening said first channel also.

While in the above description it has been pointed out that there is a single synchronizing pulse for a given number of cycles of the ring counter, thereby saving in the number of synchronizing pulses required, it is also obvious that a single synchronizing pulse for each cycle of a ring counter might also be employed.

Figure 1:
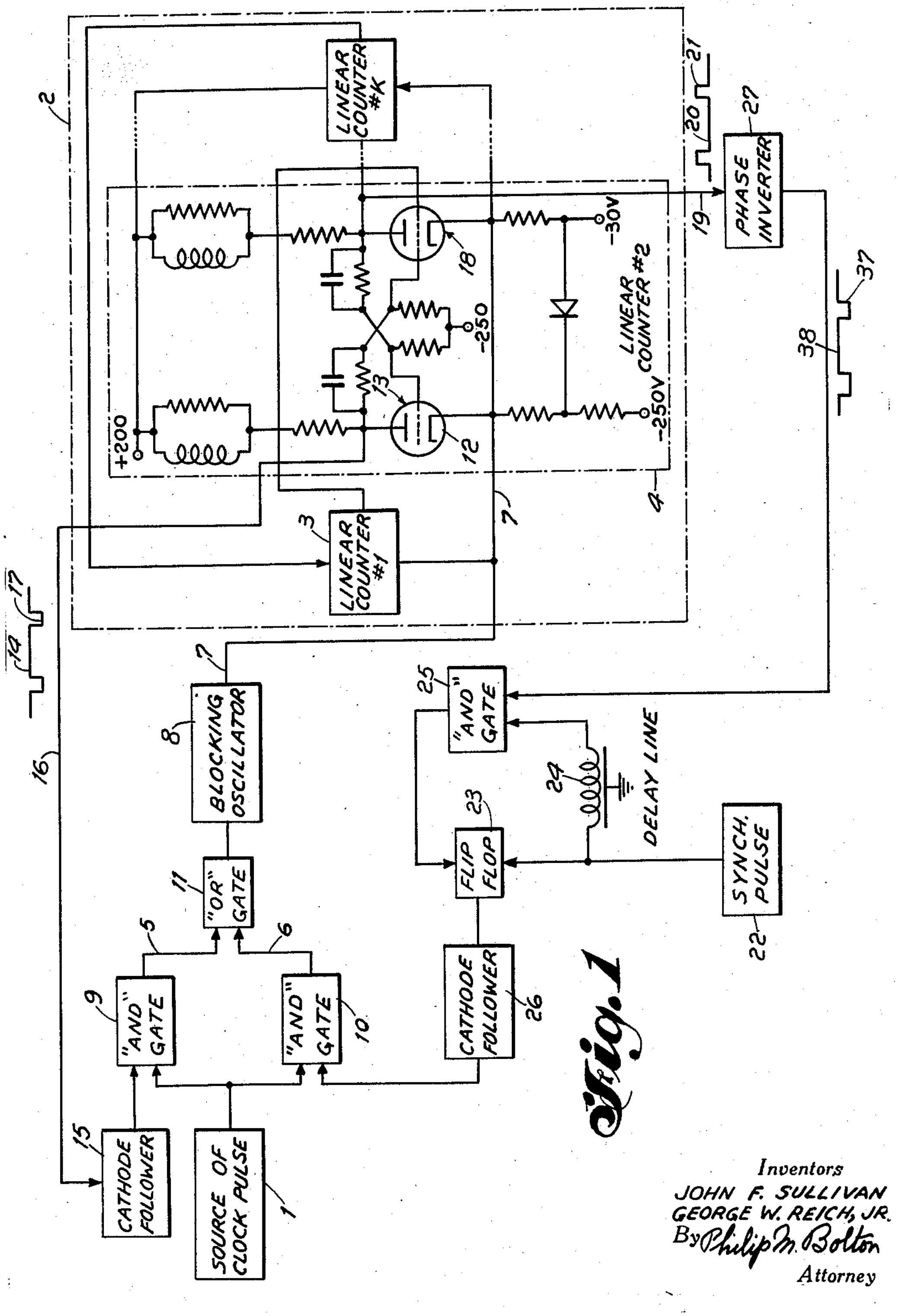
Fig. 1 is a simplified block diagram of a system used to synchronize ring counters.
Figure 2:
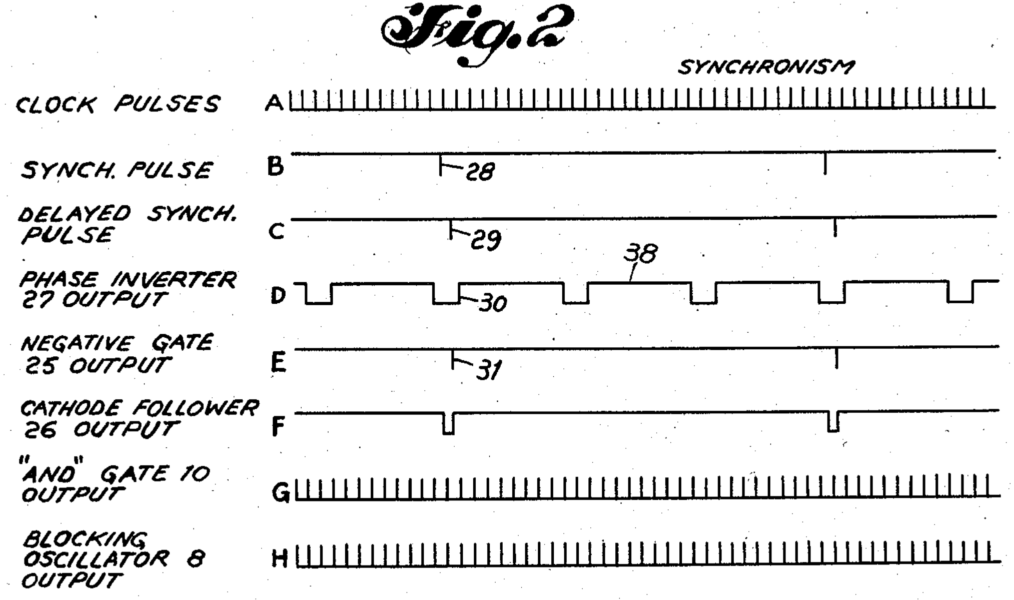
Fig. 2 is a set of waveform sequences useful in explaining the operation of the synchronizing system when in synchronism.
Figure 3:
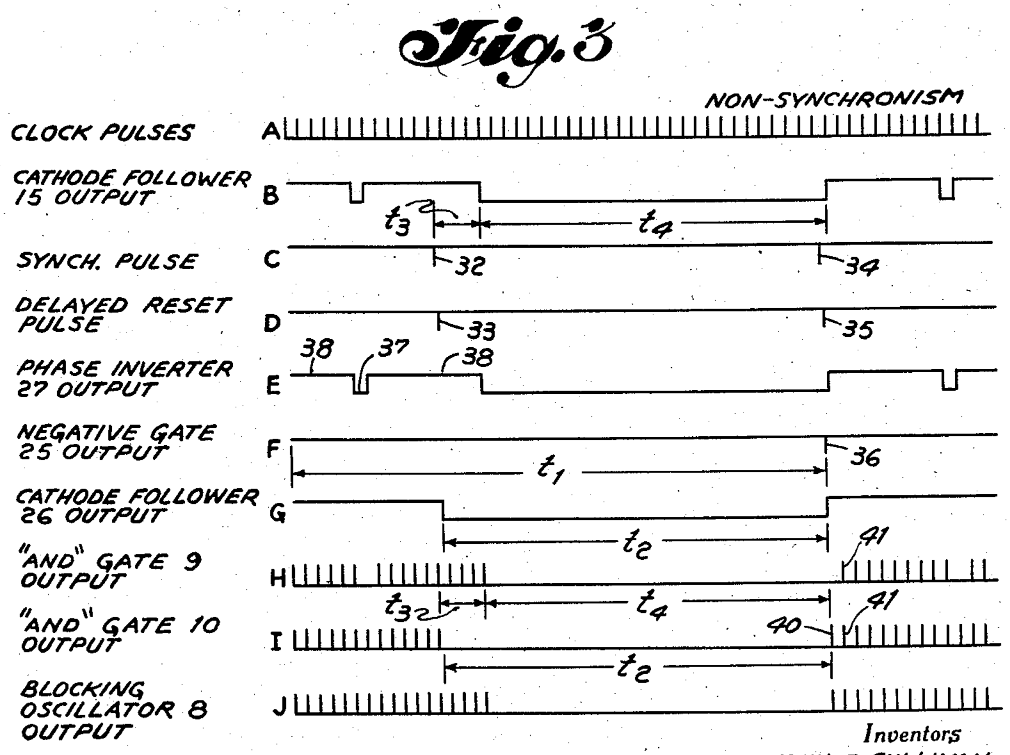
Fig. 3 is a set of waveform sequences useful in explaining the operation of the synchronizing system when not in synchronism.

Referring now specifically to Fig. 1, pulses from a source of clock pulses 1, as shown in Figs. 2 or 3, curve A, are to be counted in a ring counter 2 having a plurality of similar stages 3, 4 . . . K. The pulses from source 1 are applied through two paths 5 and 6 to a common path 7 and thence through a pulse regenerator in the form of a blocking oscillator 8 to all the stages of the ring counter 2. To control the conductivity in paths 5 and 6, there are provided logical "And" circuits 9 and 10, respectively, in said paths. The output of the two paths 5 and 6 are then applied to a logical "Or" circuit 11 before being applied to the common path 7. The output of the common path 7 is applied to the cathode 12 of each of the bistable stages of the counter as is illustrated in Fig. 1 with respect to stage 4. Ordinarily, the left triode 13 of each counter stage, except one, is non-conductive, and the anode of said triode 13 produces a positive potential 14 which is applied through a cathode follower 15 along line 16 which cathode follower applies a potential to "And" circuit 9 opening said gate and allowing the counting pulses to pass therethrough. However, when the count arrives at stage 4 so that stage 4 is switched the left triode 13 becomes conducting applying a negative voltage 17 via the cathode follower 15 to the "And" or gating circuit 9, thereby blocking channel 5. It will also be noted that prior to this switching of stage 4 the anode of the right triode 18 of stage 4 is normally negative as indicated at 20, but upon the switching operation just described it becomes positive as shown at 21 at the same time that line 16 becomes negative as shown at 17. This fact is to be remembered as it is significant in the subsequent operation. From the foregoing description, it will be seen that normally "And" gates 9 and 10 are open and that the clock pulses are fed through both gates until the count reaches stage 4, whereupon gate 9 and therefore channel 5 is closed and the pulses are then only fed through gate 10 of channel 6.

To provide the synchronizing function, synchronizing pulses are provided from a source 22, where synchronizing pulses occur at a periodicity equal to an integral number of times, for example, three times, the periodicity of one cycle of the ring counter when it is operating uninterruptedly; that is, there are normally three cycles of the ring counter for each synchronizing pulse.

Each synchronizing pulse 28, Fig. 2, curve B, from source 22 is applied to a bistable or flip-flop circuit 23. Each pulse 28 turns flip-flop 23 which is normally "on," to the "off" condition. The output of flip-flop 23 is then negative and is applied through a cathode follower 26 to block "And" gate 10, thereby blocking channel 6. Each synchronizing pulse from source 22 is also applied via a delay line 24 to "And" gate 25. The output of "And" gate 25 is coupled to flip-flop 23, and when "And" gate 25 is conductive its output restores flip-flop 23 to its "on" condition unblocking "And" gate 10 and channel 6 to allow the clock pulses to pass to counter 2 and the counting to proceed. If the ring counter is in proper synchronization, the "And" gate 25 is in conductive condition when the delayed synchronizing pulse is applied thereto. "And" gate 25 is in conductive condition when the count has reached stage 4 as will appear from the following. The anode of the right triode 18 of stage 4 is coupled via line 19 through a phase inverter 27 to the "And" gate 25. When the count reaches stage 4 and right triode 18 thereof become non-conducting, a positive D.C. output from the anode of right triode of stage 4 is applied to phase inverter 27. This will produce a negative "enable" gate pulse 30, Fig. 2, curve D, in the output of phase inverter 27. This negative "enable," gates pulse 30 and renders "And" gate 25 conductive and transmits the synchronizing pulse to restore flip-flop 23 to the "on" condition. (It is to be noted that the "And" gate 25 is a negative "And" gate and requires two negative voltages to be applied thereto to conduct. The synchronizing pulses are negative, and when the count has reached stage 4 the output applied to the "And" gate from phase inverter 27 is also negative as just described.) The output of cathode follower 26, which is shown in Fig. 2, curve F and which is driven from the output of flip-flop 23, will then enable "And" gate 10, and thereby allow an uninterrupted chain of clock pulses to pass, as shown in Fig. 2, curve G, to blocking oscillator 8 which provides a high voltage-low impedance driving source for ring counter 2. The output clock pulses of blocking oscillator 8 are illustrated in Fig. 2, curve H.

In the second condition when lack of synchronism exists, a synchronizing pulse 32, as shown in Fig. 3, curve C, is again applied to flip-flop 23 and sets this normally "on" flip-flop to the "off" condition. The synchronizing pulse is then delayed through delay line 24 and this delayed synchronizing pulse 33, Fig. 3, curve D, is applied to negative "And" gate 25. Since the ring counter 2 is in the non-synchronous state, the count has not reached stage 4 and the right triode 8 thereof will now be conducting. This results in a lower plate voltage in right triode 8 and thereby causes the output of phase inverter 27 to be positive as shown at 38, Fig. 3, curve E. This output results in "And" gate 25 producing no output for a period of time $T_1$, as illustrated in Fig. 3, curve F. After flip-flop 23 is turned "off" by synchronizing pulse 32, it therefore remains in the "off" condition for an interval of time $T_2$, as shown in Fig. 3, curve G, during which logical "And" circuit 10 will therefore also be inhibited, pasing no pulses, as shown in Fig. 3, curve I. Channel 5 however continues to pass clock pulses to the counter after channel 6 has been blocked by the synchronizing pulse 32 for a period $T_3$, see curves B and H, Fig. 3, until the count reaches stage 4. When the count reaches stage 4, as explained hereinbefore, triode 13 of stage 4 becomes conducting and thereby applies a negative voltage via cathode follower 15 to inhibit "And" gate 9 for a period of time $T_4$, as shown in Fig. 3, curve B. Thus, a condition now exists whereby "And" gates 9 and 10 are inhibited and the ring counter 2 remains static, with the count stopped at stage 4. This condition will continue until the next synchronizing pulse 34, Fig. 3, curve C, from source 22 occurs. The synchronizing pulse 34, after being delayed through delay line 24, as shown as pulse 35, Fig. 3, curve D, will now be gated through negative "And" gate 25 shown as pulse 36, Fig. 3, curve F, due to the fact that right triode 18 is now non-conducting, and this results in coupling a positive D.C. potential along line 19, as shown at 21, to phase inverter 27 which will then produce a negative "enable" gate 37 at the output of phase inverter 27. Thus, flip-flop 23 will return to the normally "on" condition which in turn will enable "And" gate 10 through cathode follower 26. The output of "And" gate 10 is shown in Fig. 3, curve I. Thus, the clock pulses, as illustrated in Fig. 3, curve A, will again continue through "And" gate 10 along path 6 to "or" gate 11, whereupon this output will be applied to blocking oscillator 8. The output of blocking oscillator 8, which is shown in Fig. 3, curve J, is then applied to ring counter 2. The count will then again resume and ring counter 2 will now be in the synchronous state. It is to be noted that after the first clock pulse 40, curve I, Fig. 3, is applied to shift the count from stage 4 on, then gate 9 and channel 5 are unblocked as stage 4 goes back to its usual condition of left triode 13 being non-conductive, and the next clock pulse 41 passes through both gates 9 and 10.

While we have described above the principles of our invention in connection with specific apparatus, it is to be clearly understood that this description is made only by way of example and not as a limitation to the scope of our invention as set forth in the objects thereof and in the accompanying claims.

We claim:

1. A synchronizing counter comprising a source of clock pulses, a ring counter having a plurality of stages, a pair of transmission channels coupling said clock pulse source to said counter, means coupled to one of said stages responsive to a given condition of said stage for blocking one of said channels, a source of synchronizing pulses, means responsive to the synchronizing pulses from said synchronizing pulse source for blocking the other of said channels, and means responsive to the counting condition of one of said stages and to one of said synchronizing pulses for opening said second channel.

2. A sychronizing counter system comprising a source of clock pulses, a ring counter having a plurality of stages, a pair of transmission channels coupling said clock pulse source to said counter, means coupled to one of said stages and responsive to a given condition of said stage for blocking one of said channels, a source of synchronizing pulses, means responsive to the synchronizing pulses from said synchronizing pulse source for blocking the other of said channels, and means responsive to said given condition of said one of said stages and to one of said synchronizing pulses for opening said second channel.

3. A synchronizing counter system comprising a source of clock pulses, a counter having a plurality of stages, a pair of transmission channels coupling said clock pulse source to said counter, means coupled to one of said stages and responsive to a given condition of said stage for blocking one of said channels, a source of synchronizing pulses, means responsive to the synchronizing pulses from said synchronizing pulse source for blocking the other of said channels, means for delaying the synchronizing pulses, and means responsive to said given condition of said one stage and to the concurrence therewith of one of said delayed synchronizing pulses for opening said second channel.

4. A system according to claim 3, wherein said counter is a ring counter and said given condition is that at which the count has been transferred to said one stage.

5. A synchronizing counter system comprising a source of clock pulses, a ring counter having a plurality of bistable devices each of which is conditioned to a predetermined state as the count is transferred thereto, a first and second channels coupling said clock pulse source to said counter, a first and second gates in said first and second channels respectively to control the clock pulses passing therethrough, means coupling a given one of said bistable devices to said first gate and responsive to said predetermined condition of said given bistable device to block said gate each time the count is transferred to said given bistable device, a synchronizing pulse source, means coupling said synchronizing pulse source to said second gate and responsive to a synchronizing pulse for blocking said second gate, a delay means, means coupling said delay means to said synchronizing pulse source to produce delayed synchronizing pulses at the output of said delay means, and means coupled to said given stage and to the output of said delay means and responsive to the coincidence of a delayed synchronizing pulse of said predetermined condition of said given device for unblocking said second gate to thereby allow clock pulses to pass through said second channel and operate said ring counter.

References Cited in the file of this patent

UNITED STATES PATENTS

| | | |
|---|---|---|
| 2,680,195 | Thompson | June 1, 1954 |
| 2,781,447 | Lester | Feb. 12, 1957 |